US008471846B2

(12) United States Patent
Kohlmann et al.

(10) Patent No.: US 8,471,846 B2
(45) Date of Patent: Jun. 25, 2013

(54) METHOD AND APPARATUS FOR DETERMINING MEDICAL IMAGE POSITION

(75) Inventors: Peter Kohlmann, Bremen (DE); Lukas Mroz, Vienna (AT); Rainer Wegenkittl, Sankt Poelten (AT); Stefan Bruckner, Vancouver (CA); Eduard Groeller, Vienna (AT); Armin Kanitsar, Vienna (AT)

(73) Assignee: Agfa HealthCare, NV, Mortsel (BE)

( * ) Notice: Subject to any disclaimer, the term of this patent is extended or adjusted under 35 U.S.C. 154(b) by 796 days.

(21) Appl. No.: 12/625,771

(22) Filed: Nov. 25, 2009

(65) Prior Publication Data

US 2010/0135554 A1  Jun. 3, 2010

(30) Foreign Application Priority Data

Nov. 28, 2008 (EP) .................................... 08170289

(51) Int. Cl.
 *G06T 15/00* (2011.01)
(52) U.S. Cl.
 USPC ............ 345/419; 345/420; 345/422; 345/581
(58) Field of Classification Search
 USPC .................................. 345/419, 420, 422, 581
 See application file for complete search history.

(56) References Cited

U.S. PATENT DOCUMENTS

| 5,371,778 | A | 12/1994 | Yanof et al. | |
|---|---|---|---|---|
| 7,746,340 | B2 * | 6/2010 | Florin et al. | 345/420 |
| 2008/0117225 | A1 | 5/2008 | Wegenkittl et al. | |
| 2008/0117229 | A1 | 5/2008 | Wegenkittl et al. | |
| 2008/0117230 | A1 | 5/2008 | Wegenkittl et al. | |
| 2008/0118120 | A1 | 5/2008 | Wegenkittl et al. | |
| 2008/0118129 | A1 | 5/2008 | Wegenkittl et al. | |
| 2008/0118237 | A1 | 5/2008 | Wegenkittl et al. | |

(Continued)

FOREIGN PATENT DOCUMENTS

| EP | 1 308 903 A1 | 5/2003 |
|---|---|---|
| EP | 1 791 087 A1 | 5/2007 |

(Continued)

OTHER PUBLICATIONS

Balabanian, J-P., et al, "Hierarchical Volume Visualization of Brain Anatomy," VMV 2008, Vision, Modeling and Visualization, pp. 313-322, 2008.

(Continued)

*Primary Examiner* — Phu K Nguyen
(74) *Attorney, Agent, or Firm* — Houston & Associates, LLP

(57) ABSTRACT

A method and a corresponding apparatus for determining a position in an image, in particular a medical image enables a reliable determination of positions of interest in images of a variety of structures by displaying a volume rendering of image data acquired from an object, in particular a patient, pointing at a structure of interest displayed in the volume rendering of the image data, generating a viewing ray profile comprising information characterizing a ray running through said structure of interest, selecting a contextual profile from various contextual profiles, each of said contextual profiles comprising a representative ray profile representing a viewing ray profile of a structure, in particular an anatomical structure, and comprising profile information, and determining a position within said structure of interest based on said profile information of said selected contextual profile in the case that the representative ray profile of said selected contextual profile is matching with at least a part of said viewing ray profile.

19 Claims, 6 Drawing Sheets

U.S. PATENT DOCUMENTS

| | | | |
|---|---|---|---|
| 2008/0119723 | A1 | 5/2008 | Wegenkittl et al. |
| 2008/0120132 | A1 | 5/2008 | Wegenkittl et al. |
| 2008/0126487 | A1 | 5/2008 | Wegenkittl et al. |
| 2009/0002366 | A1 | 1/2009 | Kanitsar et al. |
| 2009/0138544 | A1 | 5/2009 | Wegenkittl et al. |

FOREIGN PATENT DOCUMENTS

| | | |
|---|---|---|
| EP | 2 048 621 A1 | 4/2009 |
| EP | 2 144 199 A1 | 1/2010 |
| GB | 2 431 308 A | 4/2007 |
| WO | 2010/003804 A2 | 1/2010 |

OTHER PUBLICATIONS

Bartroli, A., "Virtual Colon Unfolding," Journal Machine Graphics & Vision, vol. 8, No. 3, 1999, pp. 469-487.

Bauer, C., et al., "Extracting curve skeletons from gray value images for virtual endoscopy," Proceedings of the 4th International Workshop on Medical Imaging and Augmented Reality, pp. 393-402, 2008.

Bauer, C., et al., "A novel approach for detection of tubular objects and its application to medical image analysis," Proceedings of the 30th DAGM Symposium on Pattern Recognition, pp. 163-172, 2008.

Bruckner, S., et al, "BrainGaser—Visual Queries for Neurobiology Research," IEEE Transactions on Visualization and Computer Graphics, 15(6):1497-1504, 2009.

Bruckner, S., et al., "Enhancing Depth-Perception with Flexible Volumetric Halos," IEEE Transactions on Visualization and Computer Graphics, 13(6):1344-1351, 2007.

Bruckner, S., et al., "Exploded Views for Volume Data," IEEE Transactions on Visualization and Computer Graphics, 12(5):1077-1084, 2006.

Bruckner, S., et al., "Illustrative Context-Preserving Exploration of Volume Data," IEEE Transactions on Visualization and Computer Graphics, 12(6):1559-1569, 2006.

Bruckner, S., et al., "Instant Volume Visualization using Maximum Intensity Difference Accumulation," Computer Graphics Forum, 28(3):775-782, 2009.

Bruckner, S., et al., "Integrating Volume Visualization Techniques Into Medical Applications," Proceedings of 5th IEEE International Symposium on Biomedical Imaging: From Nano to Macro, pp. 820-823, 2008.

Bruckner, S., et al., "Style Transfer Functions for Illustrative Volume Rendering," Computer Graphics Forum, 26 (3):715-724, 2007.

Bruckner, S., et al., "VolumeShop: An Interactive System for Direct Volume Illustration," Proceedings of IEEE Visualization 2005, pp. 671-678. 2005.

Burns, M., et al., "Feature Emphasis and Contextual Cutaways for Multimodal Medical Visualization," Data Visualization—EuroVis 2007, pp. 275-282, 2007.

Capek, M., et al., "Multimodal Volume Registration Based on Spherical Markers," Conference proceedings of the 9th International Conference in Central Europe on Computer Graphics, Visualization and Computer Vision, vol. 1, pp. 17-24, 2001.

Charette, R. N., "Visualizing electronic health records with 'Google-Earth for the body,'" IEEE Spectrum Online, Jan. 2008. Available online at http://www.spectrum.ieee.org/jan08/5854/, Sep. 2008.

Csebfalvi, B., et al, "Interactive Volume Rendering based on a 'Bubble Model'," Proceedings of Graphics Interface, pp. 209-216, 2001.

Frangi, A. F., et al., "Multiscale vessel enhancement filtering," Proceedings of MICCAI 1998, pp. 130-137, 1998.

Glanzing, M., et al., "Locally Adaptive Marching Cubes through Iso-Value Variation," Proceedings of the International Conference in Central Europe on Computer Graphics, Visualization and Computer Vision, pp. 33-40, 2009.

Götzelmann, T. et al, "Mutual text-image queries." Proceedings of Spring Conference on Computer Graphics 2007, pp. 181-188, 2007.

Grimm, S., et al, "Flexible Direct Multi-Volume Rendering in Interactive Scenes," Vision, Modeling, and Visualization (VMV), pp. 386-379, 2004.

Haidacher, N., et al., "Information-based Transfer Functions for Multimodal Visualization," VCBM , pp. 101-108, 2008.

Hauser, H. et al., "Two-level volume rendering—fusing MIP and DVR," Proceedings of IEEE Visualization, pp. 211-218, 2000.

Hladuvka, J., et al., "Exploiting the Hessian matrix for content-based retrieval of volume-data features," Visual Computer, 18(4):207-217, 2002.

JDOM API Project Website. Available online at http://www.jdom.org, Sep. 2008.

Kanitsar, A., et al., "Advanced Curved Planar Reformation: Flattering of Vascular Structures," Proceedings of IEEE Visualization, pp. 43-50, 2003.

Kanitsar, A., et al., "CPR—Curved Planar Reformation," IEEE Visualization 2002, pp. 37-44, 2002.

Kanitsar, A., et al., Peripheral Vessel Investigation for Routine Clinical Use, Proceedings of IEEE Visualization, pp. 91-98, 2001.

Kohlmann, P., et al., "Evaluation of a Bricked Volume Layout for a Medical Workstation based on Java," Journal of WSCG, 15(1-3):83-90, 2007.

Kohlmann, P. et al., "LiveSync: Deformed viewing spheres for knowledge-based navigation." IEEE Transactions on Visualization and Computer Graphics, 13(6):1544-1551, 2007.

Kohlmann, P., et al., "LiveSync++: Enhancements of an interaction metaphor," Proceedings of Graphics Interface 2008, pp. 81-88, 2008.

König, A. et al., "Multiple Views and Magic Mirrors—fMRI Visualization of the Human Brain," Proceedings of Spring Conference on Computer Graphics and its Applications, pp. 130-139, 1999.

Kovács, T., et al., "Automatic segmentation of the vessel lumen from 3D CTA images of aortic dissection," Proceedings of Bildverarbeitung für die Medizin 2006, pp. 161-165, 2006.

Lorenz, C. , "Multi-scale line segmentation with automatic estimation of width, contrast and tangential direction in 2D and 3D medical images," Proceedings of the First Joint Conference on Computer Vision, Virtual Reality and Robotics in Medicine and Medical Robotics and Computer-Assisted Surgery, pp. 233-242. Springer-Verlag, 1997.

Malik, M., et al., "Feature peeling," Proceedings of Graphics Interface 2007, pp. 273-280, 2007.

Mroz, L. et al., "Mastering Interactive Surface Rendering for Java-Based Diagnostic Applications," Proceedings of IEEE Visualizations, pp. 437-440, 2000.

Mroz, L. et al., "Real-Time Maximum Intensity Projection," Data Visualization'99, Springer Wien, pp. 135-144, 1999.

Mühler, K., et al., "METK—The Medical Exploration Toolkit," available online at http://www.metk.net, Sep. 2008.

National Electrical Manufacturers Association (NEMA). The DICOM Standard. Digital Imaging and Communications in Medicine (DICOM). Available online at http://medical.nema.org, Sep. 2008.

Official IBM Website. Available online at http://www.ibm.com, Sep. 2008.

Osirix. DICOM Sample Image Sets Website. Available online at http://pubimage.hcuge.ch:8080/, Sep. 2008.

Patel, D., "Moment Curves," Proceedings of the IEEE Pacific Visualization Symposium 2009, pp. 201-208, 2009.

Rautek, P., et al., "Interaction-Dependent Semantics for Illustrative Volume Rendering," Computer Graphics Forum, 27(3):847-854, 2008.

Rautek, P., et al., "Semantic Layers for Illustrative Volume Rendering," IEEE Transactions on Visualization and Computer Graphics, 13(6):1336-1343, 2007.

Roos, J., et al., "Multipath Curved Planar Reformation of the Peripheral Arterial Tree in CT Angiography," Journal Radiology, 244(1):281-290, 2007.

Sato, Y., "Tissue classification based on 3D local intensity structures for volume rendering," IEEE Transactions on Visualization and Computer Graphics, 6(2):160-180, 2000.

Soltészová V., et al., "Advanced Volume Painting with Game Controllers," Proceedings of the 25th Spring Conference on Computer Graphics (SCCG), pp. 125-132, 2009.

Straka, M., et al, "The VesselGlyph: Focus & Context Visualization in CT-Angiography." IEEE Visualization 2004, pp. 392-385, 2004.

Tek, H., et al., "Vessel detection by mean shift based ray propagation," Proceedings of IEEE Workshop on Mathematical Methods in Biomedical Image Analysis 2001, pp. 228-235, 2001.

Termeer, M., "CoViCAD: Comprehensive Visualization of Coronary Artery Disease," IEEE Transactions on Visualization and Computer Graphics, 13(6):1632-1639, 2007.

Termeer, M., "Visualization of Myocardial Perfusion Derived from Coronary Anatomy," TVCG, 14(6):1595-1602, 2008.

Tietjen, C., et al., "Enhancing slice-based visualizations of medical volume data," In Proceedings of IEEE/ Eurographics Symposium on Visualization 2006, pp. 123-130, 2006.

Tietjen, C., et al. METK—The medical exploration toolkit, Proceedings of Bildverarbeitung für die Medizin 2008, pp. 407-411, 2008.

Tietjen. C., et al., "A software-assistant for pre-operative planning and visualization of neck dissections," CURAC 2006, pp. 176-177, 2006.

Tschirren, J., et al, "Intrathoracic airway trees: Segmentation and airway morphology analysis for low-dose CT scans," IEEE Transactions on Medical Imaging, 24(12):1529-1539, 2005.

Vilanova, A, et al., "Cylindrical Approximation of Tubular Organs for Virtual Endoscopy," Proceedings of Computer Graphics and Imaging, pp. 283-289, 2000.

Vilanova, A, et al., "VirEn: A Virtual Endoscopy System," Journal Machine Graphics & Vision, vol. 8(3), pp. 469-487, 1999.

Viola, I., et al., "Hardware-Based Nonlinear Filtering and Segmentation using High-Level Shading Languages," Proceedings of IEEE Visualization 2003, pp. 309-316, 2003.

Viola, I., et al., "Importance-Driven Feature Enhancement in Volume Visualization," IEEE Transactions on Visualization and Computer Graphics, 11(4):408-418, 2005.

Viola, I., et al., "Importance-Driven Volume Rendering," Proceedings of IEEE Visualization 2004, pp. 139-145, 2004.

Viola, I., et al., "Smart Visibility in Visualization," Proceedings of EG Workshop on Computational Aesthetics Computational Aesthetics in Graphics, Visualization and Imaging, pp. 209-216, 2005.

Wagner, D., et al., "Endo View: A Phantom Study of a Tracked Virtual Bronchoscopy," Journal of WSCG, 10 (2):493-498, 2002.

Wegenkittl, R., et al., "Mastering Interactive Virtual Bronchioscopy on a Low-End PC," Proceedings of IEEE Visualization, pp. 461-464, 2000.

Xu, C. et al, "Gradient vector flow: A new external force for snakes," Proceedings of the Conference on Computer Vision and Pattern Recognition 1997, pp. 66-71, 1997.

European Search Report dated May 20, 2009, from counterpart European Application No. EP 08170289.6, filed on Nov. 28, 2008.

* cited by examiner

METHOD AND APPARATUS FOR DETERMINING MEDICAL IMAGE POSITION

RELATED APPLICATIONS

This application claims priority to European Patent Application No. EP08170289.6, filed on Nov. 28, 2008 which is incorporated herein by reference in its entirety.

BACKGROUND OF THE INVENTION

Current computer hardware allows for the display of volume data with different rendering techniques simultaneously and in real time. For a certain medical diagnostic task in the clinical routine, a hanging protocol defines how the data are reformatted and arranged on the screen. For some examinations, e.g., in mammography, the hanging protocol is highly standardized, whereas, e.g., in vascular examinations, more often customized hanging protocols are preferred. Frequently, Multi-Planar Reformatting (MPR) is the technique of choice to provide sectional renderings. With a Curved Planar Reformation (CPR) the whole extent of a tubular structure is displayed within a single image.

These two-dimensional (2D) renderings are often accompanied by a Direct Volume Rendering (DVR) technique like ray casting. The examination of a structure in its three-dimensional (3D) setting often provides better insights into contextual information. A typical hanging protocol arranges a side-by-side presentation of different views of the volumetric data. The physician performs different interactions during the examination of the data. Examples of frequently recurring interactions are scrolling through slices (2D images), zooming, panning, labeling, windowing (2D/3D images) or viewpoint selection and clipping (3D images).

The synchronization of the different views is quite challenging because it is not trivial to determine if an interaction in one view leads to changes within another view.

In European patent application No. 07118075.6 and scientific publications of Kohlmann et al., see P. Kohlmann, S. Bruckner, A. Kanitsar, and M. E. Gröller. LiveSync: Deformed viewing spheres for knowledge-based navigation. IEEE Transactions on Visualization and Computer Graphics, 13(6):1544-1551, 2007 and P. Kohlmann, S. Bruckner, A. Kanitsar, and M. E. Gröller. LiveSync++: Enhancements of an interaction metaphor. In Proceedings of Graphics Interface 2008, pages 81-88, 2008, solutions for the live synchronization of a 2D slice view and a 3D volumetric view were provided, wherein viewing parameters for the 3D view are derived automatically from a picking on the anatomical structure of interest on the 2D slice. The viewing parameters are viewpoint, zoom factor, clipping planes and transfer function setup.

In medical visualization some techniques have been developed to ease the interaction with multiple views of a certain data set. T. Götzelmann, P.-P. Vázquez, K. Hartmann, T. Germer, A. Nürnberger, and T. Strothotte. Mutual text-image queries. In Proceedings of Spring Conference on Computer Graphics 2007, pages 181-188, 2007 presented an approach where 3D visualizations are linked with textual descriptions, e.g., from medical textbooks. This approach focuses on an educational purpose and supports students to learn the terminology and to understand textual descriptions of complex objects. Related to this work, IBM, see The Official IBM Website, September 2008, is currently developing the Anatomic and Symbolic Mapper Engine (ASME), R. N. Charette. Visualizing electronic health records with "Google-Earth for the body". IEEE Spectrum Online, January 2008. Available online at http://www.spectrum.ieee.org/jan08/5854/, September 2008. This technology uses a 3D model of the human body which is linked to medical records. Whenever the doctor clicks on a certain part of the body, a search of the medical records is triggered to extract the relevant information. The Medical Exploration Toolkit (METK), Medical Exploration Toolkit. Available online at http://www.metk.net, September 2008, presented by C. Tietjen, K. Mühler, F. Ritter, O. Konrad, M. Hindennach, and B. Preim. METK—The medical exploration toolkit. In Proceedings of Bildverarbeitung für die Medizin 2008, pages 407-411, 2008, bundles various concepts for loading, visualizing and exploring segmented medical data sets. Critical distances to pathological structures are computed and displayed in a synchronized manner in 2D and 3D. The integrated LIFTCHART, see C. Tietjen, B. Meyer, S. Schlechtweg, B. Preim, I. Hertel, and G. Strauβ. Enhancing slice-based visualizations of medical volume data, In Proceedings of IEEE/Eurographics Symposium on Visualization 2006, pages 123-130, 2006, displays the overall extents of structures within the volume in a narrow frame as color bars. A structure can be selected in the LIFTCHART and the corresponding slice is displayed in the slice viewer. Another clinical application they integrated is the NECK-SURGERYPLANNER, C. Tietjen, B. Preim, I. Hertel, and G. Strauβ, A software-assistant for pre-operative planning and visualization of neck dissections. In CURAC 2006, pages 176-177, 2006. Segmented structures can be enabled and disabled by a textual representation. They are synchronously highlighted in the 3D and 2D views to support operation planning for neck dissections.

Some research has concentrated on the extraction of certain anatomical structures. Especially for the detection of curvilinear structures multi-scale filtering approaches are well-known. Vessel enhancement filters based on eigenvalue analysis of the Hessian matrix have been proposed, e.g., C. Lorenz, I.-C. Carlsen, T. M. Buzug, C. Fassnacht, and J. Weese, Multi-scale line segmentation with automatic estimation of width, contrast and tangential direction in 2D and 3D medical images. In Proceedings of the First Joint Conference on Computer Vision, Virtual Reality and Robotics in Medicine and Medical Robotics and Computer-Assisted Surgery, pages 233-242. Springer-Verlag, 1997; Y. Sato, C.-F. Westin, A. Bhalerao, S. Nakajima, N. Shiraga, S. Tamura, and R Kikinis, Tissue classification based on 3D local intensity structures for volume rendering, IEEE Transactions on Visualization and Computer Graphics, 6(2):160-180, 2000; and A. F. Frangi, W. J. Niessen, K. L. Vincken, and M. A. Viergever, Multiscale vessel enhancement filtering, In Proceedings of MICCAI 1998, pages 130-137, 1998. H. Tek, D. Comaniciu, and J. P. Williams, Vessel detection by mean shift based ray propagation, In Proceedings of IEEE Workshop on Mathematical Methods in Biomedical Image Analysis 2001, pages 228-235, 2001, presented an approach which focuses on the segmentation of vessel cross sections. A single click inside the vessel on a slice initiates mean shift based ray propagation to detect the boundary of the vessel.

Other anatomical tubular structures are, e.g., the airway and the aorta. J. Tschirren, E. A. Hoffman, G. McLennan, and M. Sonka, Intrathoracic airway trees: Segmentation and airway morphology analysis from low-dose CT scans, IEEE Transactions on Medical Imaging, 24(12):1529-1539, 2005, presented an airway segmentation algorithm based on fuzzy connectivity. Their method uses small adaptive regions of interest which follow the airway branches during the segmentation process. T. Kovács, P. C. Cattin, H. Alkadhi, S. Wildermuth, and G. Székely, Automatic segmentation of the vessel lumen from 3D CTA images of aortic dissection, In Proceedings of Bildverarbeitung für die Medizin 2006, pages 161-165, 2006, developed a system for automatic segmentation of the entire aorta without any user interaction for treatment planning of aortic dissections. The segmentation is based on a Hough transformation to detect the approximate circular shape of the aorta. To fit this shape more closely to the actual contour of the aortic lumen an elastic mass-spring deformable model is utilized. An interesting concept for the detection of tubular objects in medical imaging is the Gradient Vector Flow (GVF) snake introduced by C. Xu and J. L. Prince. Gradient vector flow: A new external force for snakes. In Proceedings of the Conference on Computer Vision and Pattern Recognition 1997, pages 66-71, 1997. This method first calculates a field of forces (GVF forces) over the image domain. These forces drive the snake to fit to the boundaries of an object. C. Bauer and H. Bischof in A novel approach for detection of tubular objects and its application to medical image analysis, In Proceedings of the 30th DAGM Symposium on Pattern Recognition, pages 163-172, 2008 and C. Bauer and H. Bischof in Extracting curve skeletons from gray value images for virtual endoscopy, In Proceedings of the 4th International Workshop on Medical Imaging and Augmented Reality, pages 393-402, 2008 utilize the properties of the GVF for the detection of tubular objects and the extraction of curve skeletons, e.g., for virtual endoscopy. They argue that conventional tube detection or line filters, which use local derivatives at multiple scales have problems with undesired diffusion of nearby objects. Their GVF-based method allows an edge-preserving diffusion of gradient information. M. M. Malik, T. Möller, and M. E. Grolier, Feature peeling. In Proceedings of Graphics Interface 2007, pages 273-280, 2007, presented a rendering algorithm called feature peeling. They analyze peaks and valleys of intensity ray profiles for a given viewpoint to detect features inside the volume data. By classifying a number of feature layers it is possible to scroll through the layers to inspect various structures.

SUMMARY OF THE INVENTION

For each point on a 2D slice its exact 3D position can be calculated easily, whereas the picking of a point in the 3D volumetric view is not well defined. This is due to the fact that for each pixel on the screen ray casting is performed, where opacity and color is accumulated along a ray from the eye point through the volume data. Potentially each position along this ray might be the desired volumetric position. A possible solution to this problem is the definition of a first-hit position being the location along the ray where a certain opacity threshold is exceeded. For some cases this might be sufficient, but often a different position is of interest. The overview of related works indicates that often highly specialized methods are used to detect particular anatomical structures within the volumetric data.

The invention relates to a method and an apparatus for determining a position in an image, in particular a medical image The present invention can provide a general method or apparatus for reliably determining positions of interest in images of a variety of structures.

The method according to the invention comprises the following steps: displaying a volume rendering of image data acquired from an object, in particular a patient, pointing at a structure of interest displayed in the volume rendering of the image data, generating a viewing ray profile comprising information characterizing a ray running through said structure of interest, in particular through a volume intersection of said structure of interest, selecting a contextual profile from various contextual profiles, each of said contextual profiles comprising a representative ray profile representing a viewing ray profile of a structure, in particular an anatomical structure, and comprising profile information, and determining a position within said structure of interest based on said profile information of said selected contextual profile in the case that the representative ray profile of said selected contextual profile is matching with at least a part of said viewing ray profile.

The apparatus according to the invention comprises: a display for displaying a volume rendering of image data acquired from an object, in particular a patient, a pointing unit for pointing at a structure of interest displayed in the volume rendering of the image data, and a processing unit for generating a viewing ray profile comprising information characterizing a ray running through said structure of interest, in particular through a volume intersection of said structure of interest, selecting a contextual profile from a list of contextual profiles, each of said contextual profiles comprising a representative ray profile representing a viewing ray profile of a structure, in particular an anatomical structure, and comprising profile information, and determining a position within said structure of interest based on said profile information of said selected contextual profile in the case that the representative ray profile of said selected contextual profile is matching with at least a part of said viewing ray profile.

The invention is based on the approach to handle the picking or pointing at a structure of interest in a 3D volumetric view in a context-sensitive way. Therefore, the method according to the invention is also referred to as "contextual picking".

To this end, a position of interest within volumetric data is determined using ray profile templates which are designed to represent anatomical structures like, e.g., a vessel, the aorta, the airway, or a vertebra. The ray profile, which is calculated for each current picking on the 3D volumetric view, is then scanned and analyzed to find similarities to the pre-defined ray profile templates stored in a knowledge base. In the case that a pre-defined ray profile template of a particular structure is similar to or identical with the ray profile of the currently picked structure of interest, a position of interest within the currently picked structure of interest is determined by considering profile information associated with the pre-defined ray profile template of said particular structure.

By means of the invention, positions of interest in images of a large variety of different structures can be determined with high reliability. Positions of interest can be the first-hit position of the current structure of interest or its center along the analyzed ray. For the examination of anatomical structures, frequently center points are of special interest because the first-hit position does usually not provide these positions due to self-occlusion or occlusion by other structures.

In an advantageous application of the invention there are two or more—or even a bundle—of rays running through said structure of interest and hence two or more respective viewing ray profiles. Each of these viewing ray profiles is processed according to the invention resulting in a very reliable determination of a position of interest.

Moreover, it is possible to apply the invention to two or more different image data sets acquired from the object by means of different imaging modalities, e.g. a CT data set and an NMR data set. For each of the data sets a viewing ray profile is obtained and processed according to the invention resulting in a particularly context-sensitive determination of a position of interest within the picked structure.

Preferably, a data set comprising said image data and meta data is obtained when an image of the object is acquired, said meta data characterizing the object and/or the acquisition of the image data, and wherein the selection of the contextual profile is based on said meta data. By this means, the number of anatomical structures, which are of possible relevance for the examination of the currently selected structure of interest, is reduced significantly enabling a fast determination of the position of interest.

Preferably, the data set of the object is in DICOM format. The DICOM format is an open standard for medical images comprising image data and meta information like parameters of the scanner and patient information. Details concerning specific DICOM tags can be found in document ftp://medical.nema.org/medical/dicom/2008/08_03pu.pdf. The method according to the invention extracts contextual information automatically from the DICOM data set. Due to the utilization of DICOM meta data no additional information acquisition or input is required for the selection of the contextual profile.

It is, moreover, preferred that said meta data, in particular the DICOM meta information of a DICOM data set, comprise information about at least one of the following:

a part of the object to be examined, e.g. vertebra, vessel, aorta or spine, according to DICOM tag (0018, 0015), a description of an examination of the part of the object according to DICOM tag (0008, 1030), age and/or sex and/or weight of a patient, an imaging modality, e.g. a CT, NMR or CR system, by means of which the image data was acquired, spatial relations of images within a series of images of the object according to DICOM tag (0008, 0254), a protocol name according to DICOM tag (0018, 1030) comprising a user-defined description of conditions under which a series of images of the object was performed, a description of a performed procedure step according to DICOM tag (0040, 0254) comprising an institution-generated description or classification of the procedure step that was performed.

By considering at least a part of this information a reliable and fast selection of possibly relevant contextual profiles from the knowledge base is possible.

In another preferred embodiment of the invention the selection of the contextual profile is based on information characterizing a setup of a medical workstation by means of which the image data are acquired and/or displayed. Alternatively or additionally, the selection of the contextual profile is based on information characterizing a selection of a clinical tool to be used for certain diagnostic actions, e.g. for vessel tracking or spine labeling. Each of these embodiments contributes to a reliable and simple selection of relevant contextual profiles.

Preferably, said profile information comprising information about at least one of the following:

a type of the structure, e.g. vertebra, a list of keywords characterizing a type of data sets and/or a setup of a medical workstation, e.g. orthopedic, a range of a typical extent of the structure, a default reaction upon pointing at the structure of interest, a kind of a position to be determined, e.g. a position in the center of the structure or a first-hit position.

By considering at least a part of this information the position within said structure of interest can be determined in an exact and context-sensitive way.

Preferably, the viewing ray profile of the currently selected structure of interest comprises intensity values and/or gradient magnitude values along a ray running through said structure of interest, in particular through a volume intersection of said structure of interest.

Additionally or alternatively, the viewing ray profile of the currently selected structure of interest comprises second order derivatives and/or higher order derivatives of the intensity values along the ray running through said structure of interest, in particular through a volume intersection of said structure of interest.

It is possible to compute the values along the ray by image processing means, in particular by filtering, segmentation operations during ray traversal or segmentation results from previous segmentation operations.

Additionally or alternatively, the viewing ray profile of the currently selected structure of interest comprises intensity values and/or gradient magnitude values along a ray running through said structure of interest, in particular through a volume intersection of said structure of interest.

In a particularly preferred embodiment of the invention the representative ray profile is a mean ray profile which is derived from pre-defined ray profile samples of said structure, each of said ray profile samples comprising intensity values and/or gradient magnitude values along a ray running through a volume intersection of said structure. By this means the data volume is reduced while the reliability in finding a relevant contextual profile is maintained.

Preferably, said pre-defined ray profile samples are defined by user-selection of samples from ray profiles of different structures. This has to be done only once, e.g. by domain experts, for each anatomical structure and is a very simple way of generating relevant ray profile samples. For this purpose an easy-to-use interface for the domain experts to generate new ray profile samples of anatomical structures can be implemented.

Once a 3D position of interest is determined, the next step is the presentation of the result to the physician in order to achieve an expressive representation of the image data.

For this purpose, it is preferred that the structure of interest is highlighted in the displayed volume rendering and/or in a corresponding two-dimensional rendering, particularly in synchronized 2D slice views, of the image data.

Alternatively or additionally, a label is placed at the appropriate 3D position or positions at the structure of interest in the displayed volume rendering and/or in a corresponding two-dimensional rendering of the image data. For instance, the whole spine can be labeled by picking each vertebra directly in the 3D volumetric view.

Alternatively or additionally, a centerline of the structure of interest is calculated and placed in the displayed volume rendering and/or in a corresponding two-dimensional rendering of the image data. The centerline is preferably used to display CPR renderings and/or to facilitate the segmentation of structures as explained in more detail below. It is preferred to interactively calculate approximate centerlines by tracing along tubular structures in the 3D view. These centerlines can be utilized to display CPR renderings of the structure or to guide a segmentation process.

An example illustrates a potential application area for the inventive method and apparatus: A frequently needed task during an orthopedic examination of the spine is the labeling of individual vertebrae. The vertebral column consists of 7 cervical, 12 thoracic, 5 lumbar, 5 sacral and 3 to 5 coccygeal vertebrae. If the labeling is performed on 2D slice views only, quite some scrolling through the slices is involved to navigate to a meaningful 3D position where a single label is placed. A good position for the label is the center of the vertebral body. By picking on the vertebrae in the 3D view, the contextual picking method according to the inventions allows a convenient labeling. If the label for the first picked vertebra and the labeling direction is given (e.g., start at the first thoracic vertebra T1, head-to-feet labeling direction), then a single contextual picking on the following vertebrae is sufficient to add the appropriate labels at a central position within the vertebral body.

In summary, the method and apparatus according to the invention enable a reliable and interactive identification of contextual interest points within volumetric data of a large variety of anatomical structures by picking at a direct volume rendered image. A knowledge base holds characteristic ray profile samples for different anatomical structures. A contextual profile bundles information like for which kind of data sets it should be selected, the extent of the target structure, or the action which has to be performed if there is a high response to the contextual profile. Based on this knowledge base, the contextual profiles which are applicable in the current environment are selected automatically. A profile matching algorithm analyzes the viewing ray for each contextual picking on the 3D volumetric view and returns a position within the volume with the best response to one of the selected contextual profiles. Based on this result, certain actions can be performed interactively. In the simplest case, the obtained position is the center of the selected structure and is highlighted by crosshairs in MPR views. Because of the interactivity of the underlying computations, contextual picking is also well suited to continuously trace the mouse pointer along volumetric structures. This allows to simultaneously examine the selected structure in MPR views.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Apparatus for Contextual Picking

Figure 8:
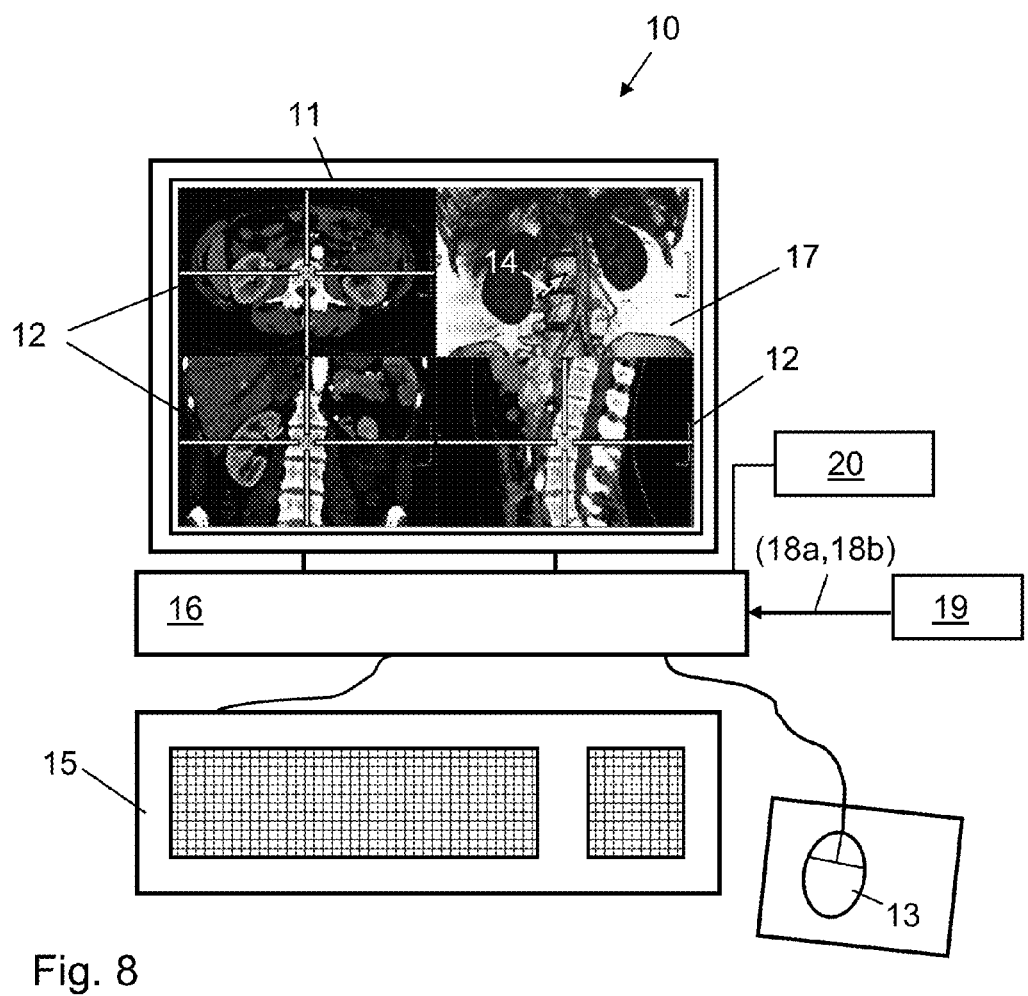
FIG. 8 shows an example of an apparatus according to the invention.

FIG. 8 shows an example of an apparatus 10 according to an implementation of the invention. Image data 18a of an object, in particular a patient, are generated by a medical imaging system 19, e.g. a CT, NMR or CR system. A medical data set (18a, 18b) comprising the image data 18a of the object and corresponding meta data 18b characterizing the object and/or the conditions of the acquisition of the image data 18a is fed to the apparatus 10. Preferably, the medial data set (18a, 18b) is in DICOM format.

Preferably, the apparatus 10 serves as a so-called medical workstation by means of which an acquisition of the image data 18a is controlled and/or meta data 18b are generated or can be inputted by a user and/or image data 18a are displayed.

The apparatus 10 comprises a display 11, e.g. a TFT screen, for displaying a volumetric view 17 and slice views 12 of the image data 18a and a mouse 13 serving as a pointing unit enabling the user, e.g. a physician, to point or to pick at a position on a structure of interest in the displayed volumetric view 17 by moving a pointer 14 to the structure of interest on the displayed volumetric view 17.

A knowledge base 20 comprises a ray profile library containing pre-defined ray profile samples of various anatomical structures, e.g. the aorta, vessels, airways or vertebrae. The knowledge base 20 also comprises at least one contextual profile for various anatomical structures, wherein each of the contextual profiles contains a representative mean ray profile and respective profile information of a particular anatomical structure.

In the example shown in FIG. 8 the knowledge base 20 is an external database, typically stored and running on a server, which can be accessed by the apparatus 10 via a suitable data connection. Alternatively or additionally, the contents of the knowledge base 10 can be stored in an internal memory of the apparatus 10.

The apparatus 10 further comprises a processing unit 16 for generating a viewing ray profile, in particular an intensity and/or gradient magnitude value profile, of a ray running through a volume intersection of said displayed structure of interest. The generation of the viewing ray profile is initiated whenever the user is pointing at a structure of interest with pointer 14 by the aid of the mouse 13.

The processing unit 16 is designed for selecting a contextual profile from a list of the contextual profiles stored in the knowledge base 20 and for determining a position within the structure of interest, which the user is currently pointing at, based on the profile information of the selected contextual profile in the case that the representative ray profile of said selected contextual profile is matching with at least a part of the viewing ray profile of the structure of interest, which the user is currently pointing at.

In a preferred embodiment, the processing unit 16 is designed for selecting a contextual profile by considering at least a part of the meta data 18b. Alternatively or additionally, it is preferred that the processing unit 16 is designed for selecting the contextual profile by taking into account information about the dedicated use of the apparatus 10 serving as a medical workstation, e.g. information about the kind of medial image acquisition and/or examination for which the apparatus 10 is used.

Contextual Picking: Overview

Figure 1:
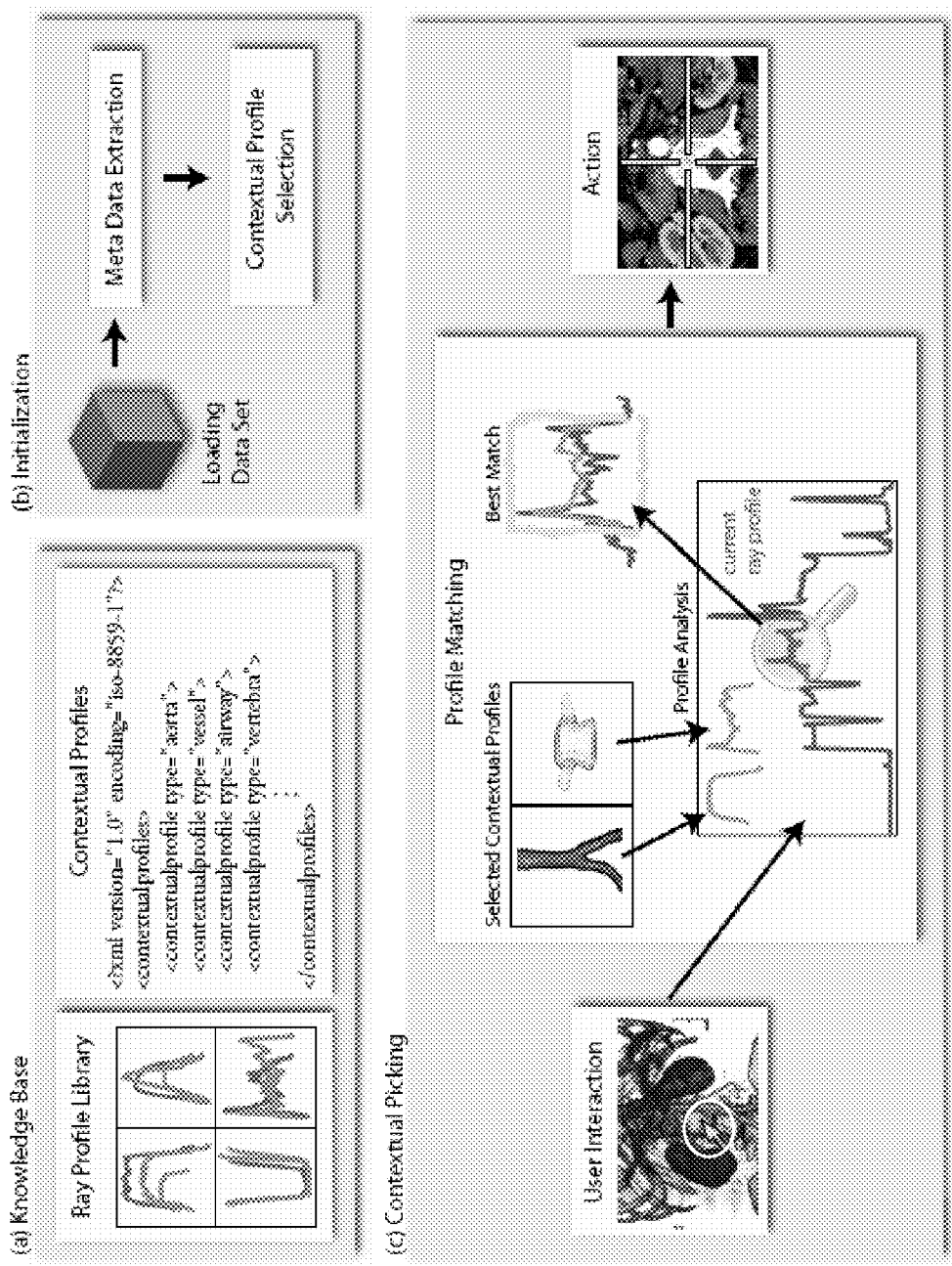
FIG. 1 shows a schematic overview of the method according to the invention.

FIG. 1 shows a schematic diagram of the contextual picking method according to an aspect of the invention.

(a) A knowledge base includes a ray profile library and contextual profiles. The ray profile library holds ray profile samples (intensities and gradient magnitudes) of various anatomical structures. A contextual profile for a certain structure bundles the needed information to react on a contextual picking operation. In the XML format it describes the following components: The type of the structure, a list of keywords, minimal and maximal extent of a structure, a representative mean ray profile built from the samples in the ray profile library, and the default reaction to a picking operation.

(b) An initialization step is performed whenever a new data set is loaded into the workstation. The DICOM header as well as the workstation environment is analyzed to extract the relevant meta data to select the applicable contextual profiles.

(c) Contextual picking is initiated by positioning—see FIG. 8—the cursor 14 of the mouse 13 on the displayed 3D view 17 and simultaneously pressing a hot key or control key on keyboard 15. Whenever the physician picks, i.e. points, at a structure of interest in the 3D view 17, the following steps are performed: First, information from the current picking, which includes the intensity and gradient magnitude values along the viewing ray, as well as accumulated opacities and positions of clipping planes, are collected. Second, the representative mean ray profiles of the selected contextual profiles are compared to the current ray profile. Finally, if a good match is detected, this result is utilized to highlight the anatomical structure of interest in an appropriate way, e.g., in MPR views. In the present example, a vertebra is highlighted.

Knowledge Base

Most approaches to automatically detect features in medical volume data need a considerable amount of user interaction to set up the needed parameters. Besides, they are often very specialized on a certain type of anatomical structure as well as a specific extent of the feature. The method and apparatus according to embodiments of the present invention were designed to be as generic as possible and easy to extend. For this purpose, a ray profile library was set up which comes along with an easy-to-use interface for the generation of new ray profile samples. Together with the contextual profiles this knowledge base provides all information to react to a contextual picking.

Ray Profile Library

The ray profile library is implemented as an XML file, which stores ray profile samples for various anatomical structures. A ray profile sample for a certain structure is comprised of a sample ID, a textual description, the spacing along the ray in mm, the extent of the structure in mm, and a list of intensity and gradient magnitude values. The method and apparatus according to the invention provides a convenient user interface to add new ray profile samples to the ray profile library.

Figure 2:
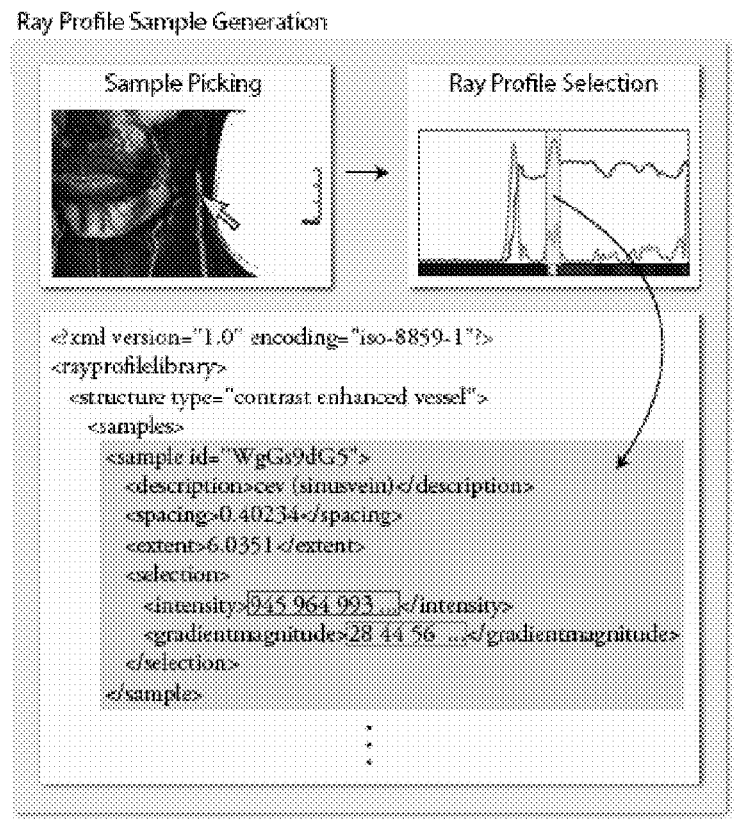
FIG. 2 shows a schematic diagram of the method for the generation of a ray profile sample.

FIG. 2 illustrates the generation of a ray profile sample of a contrast enhanced blood vessel. After picking on a vessel in the 3D view, a ray profile is generated and displayed. A plot of the ray profile shows the intensity values (dark line) and the values of the gradient magnitude (bright line) along the ray. To ease the selection of a ray profile sample, the color transfer function for the corresponding scalar values is displayed in a small horizontal bar below the profile plot.

From a selected subset of this ray profile, which represents the picked vessel, a sample is generated and stored in the ray profile library. By dragging the mouse with the left button pressed a semitransparent window is painted over the ray profile, which represents a selection along the ray. By confirming this selection, a sample for a new or an already existing structure is written to an XML file. For a certain anatomical structure it is recommendable to generate several representative samples. This is due to the fact that the intensity values of an anatomical structure can vary slightly, e.g., because of the patient's age or sex. Further, the size of the structures varies because of the mentioned factors. For example, a set of multiple samples in a contextual profile enables to detect vessels of a certain diameter range. The generation of ray profile samples has to be done only once for each anatomical structure. It is added to the library by a domain expert and is not visible to the physician who just uses the contextual picking.

Contextual Profiles

The contextual profiles are stored in an XML file which contains all needed instructions to react to a contextual picking. The following listing shows the XML skeleton of the contextual profile for an anatomical structure. First of all, it has a type entry which has to match with the corresponding structure types in the ray profile library. A list of keywords describes the type of data sets and/or the setup of the medical workstation in which the defined structure is of interest. The extent defines a range of the typical extent of the anatomical structure. In the mean ray profile entry, a mean ray profile is stored which is generated from the available ray profile samples in the ray profile library. Finally, return defines which position will be returned (e.g., the center of the structure) and which default action shall be performed (e.g., highlighting of the obtained position in MPR views).

```
<contextualprofile type="">
    <keywords>...</keywords>
    <extent>...</extent>
    <meanrayprofile>
        <spacing>...</spacing>
        <intensity>...</intensity>
        <gradientmagnitude>...</gradientmagnitude>
    </meanrayprofile>
    <return>
        <position>...</position>
        <reaction>...</reaction>
    </return>
</contextualprofile>
```

Mean Ray Profile Generation

Figure 3:
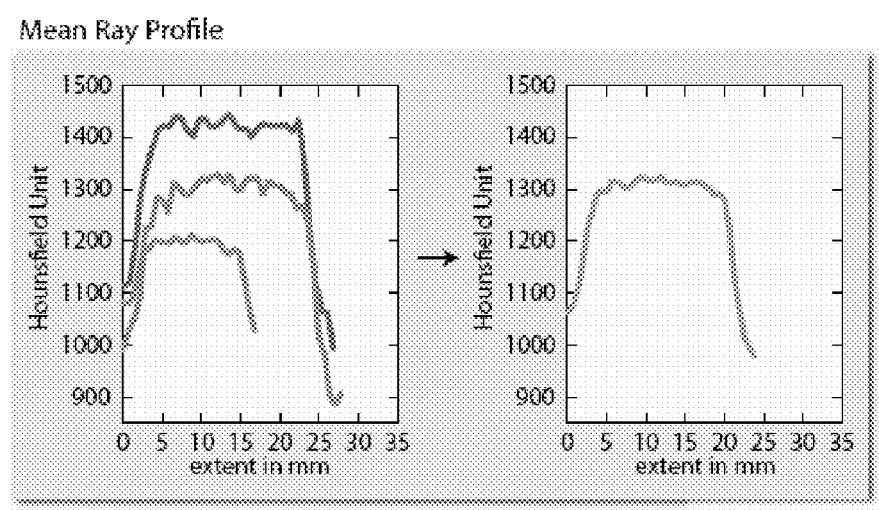
FIG. 3 shows samples of a ray profiles (left) and a representative mean ray profile (right)

The generation of a mean ray profile is motivated by the variation of intensities and extents of anatomical structures. To obtain a good representation of a structure, all samples from the ray profile library which correspond to the type of the contextual profile are collected. FIG. 3 (left) shows three intensity ray profile samples of the aorta which were all captured using different data sets. The similarities of the three samples are clearly visible. The intensity values are in a range of Hounsfield Units between about 880 and 1440 (shown on the y-axis of the plots) and the extent of the samples differs in a range between about 17.5 and 28.5 min (shown on the x-axes of the plots). In general, the samples start with a steep intensity ascent followed by a plateau and a steep intensity descent. The generated mean sample (right) shows the same characteristics with the advantage that outliers are filtered out. The algorithm for the generation of the mean ray profile first calculates the mean extent of the available samples. Then the ray profile samples are scaled horizontally by the factor sampleExtent/meanExtent. Afterwards, the mean of the corresponding intensity values is calculated at uniformly distributed positions along the x-axis. Analogously, a mean ray profile is also generated for the gradient magnitudes. Considering the mean extent of the ray profile samples is an appropriate approach when assuming an approximate Gaussian distribution of the extents for multiple samples of a single structure.

The described algorithm for the generation of the mean ray profiles is well-suited to preserve slopes which are characteristic for a certain structure. This is due to the fact that the steepness of slopes in shorter samples is decreased and the steepness of slopes in longer samples is increased by the horizontal scaling. Taking the mean of the intensity values results in a mean ray profile which represents the anatomical structure accordingly. A mean calculation has to be performed only when a new sample is added to the ray profile library.

Initialization

The contextual picking of anatomical structures in the 3D view according to embodiments of the invention is based on as much information as possible about the structure of interest. By this means, the total number of target structures in a certain examination can be narrowed down because for a certain type of examination only a small number of structures is relevant for the diagnosis. For instance, in vascular examinations vessels, veins, and arteries are of special interest, whereas in an orthopedic examination the spine and bones are more important structures.

The reduction of the total number of target structures in a certain examination has significant advantages set forth as follows. The method is based on a matching between ray profile samples from a knowledge base and the ray profile extracted for the current picking. In volume data structures are occluding each other and thus the analysis of the current ray profile with respect to all structures given in the contextual profiles might lead to ambiguous results. For example, a vessel in front of a bone is usually not relevant for an orthopedic examination. In such cases the contextual picking according to the invention can allow for an appropriate and unambiguous response. Moreover, the analysis of the current ray profile through matching with a lot of structures with varying extents can lead to high computational costs. Thus, the method according to the invention can help to keep computational costs and/or time low.

Because a further object of the invention can be to minimize the overhead of the user interaction the method and apparatus according to the invention are often designed to extract valuable meta information directly from the DICOM headers of the data sets and the current setup of the medical workstation. The DICOM format is widely used in hospitals as a standard for handling, storing, printing and transmitting information in medical imaging. DICOM files contain the image pixel data of the scanned slices combined with header information. A Patient entity contains relevant data about the patient like name, age, and sex. Data concerning the examination like the name of the physician or the description of the examination is stored in a Study entity. A Series entity represents a logical unit of information about the imaging modality (Equipment) and information about the spatial relations of images within a series (Frame of Reference). Finally, the image itself and meta data about the image are stored in an Image entity. Grouping the image and the meta data prohibits that the image data gets separated from the meta information, The National Electrical Manufacturers Association (NEMA), The DICOM Standard. Available online at http://medical.nema.org/, September 2008. To narrow down the number of structures the physician might be interested in, the following set of entries (tags) in the DICOM header is preferred:

- (0018, 0015)—Body Part Examined
- (0008, 1030)—Study Description
- (0008, 103E)—Series Description
- (0040, 0254)—Performed Procedure Step Description
- (0018, 1030)—Protocol Name When a new data set is loaded, the textual description which is stored for these entries is extracted. Further entries which contain details about the patient like sex, age, and weight can also be utilized to gather information about the size and the intensity range of a specific structure.

Preferably, it is also considered whether the medical workstation is only used for certain examinations. For instance, often a medical workstation with reduced functionality is used, e.g., as a vascular, orthopedic, cardio, or mammography workstation.

The automatically extracted information is used to select suitable contextual profiles from the knowledge base. Preferably, each contextual profile contains a list of classified keywords to decide if the represented structure is relevant for the currently loaded data set with the current setup of the workstation. The following listing shows exemplary keywords in a contextual vertebra profile.

```
<keywords>
    <strong>
        Workstation=Orthopedic
        BodyPartExamined=* SPINE ...
    </strong>
    <medium>
        BodyPartExamined= ABDOMEN ...
    </medium>
    <weak>
        BodyPartExamined=HIP ...
    </weak>
    <kickout>
        Workstation=Cardio
        Workstation=Vascular ...
    </kickout>
</keywords>
```

A list of keywords is categorized into the classes strong, medium, weak, and kickout. The information, which is extracted during loading the data set, is compared with these entries to decide if a certain anatomical structure is relevant for the current examination. In the example presented above a vertebra is strongly relevant within an orthopedic workstation and/or when the examined body part is the spine. Within a cardio or a vascular workstation a vertebra is typically not a structure of interest. With this approach it is possible to select from a ranked list the contextual profiles which are suitable in the given environment. The ranking is given by a comparison of the extracted information with the classified keywords.

Contextual Picking: Details

After one or more contextual profiles are automatically selected, the physician can perform the picking directly on the 3D view and the system provides an immediate feedback. For each contextual picking, the current ray profile is analyzed to find close similarities in the selected contextual profiles. This analysis is done by a profile matching algorithm which evaluates a cost function to measure the degree of similarity. Based on the outcome of this matching the respective action is taken. Preferably, the following actions are executed: The preferred default action is the highlighting of the center of the picked anatomical structures in MPR views. Further, contextual picking is integrated into a spine labeling system to demonstrate its potential to place labels at meaningful 3D positions. Finally, the system allows the calculation of approximate centerlines of picked tubular structures.

Profile Matching

Figure 4:
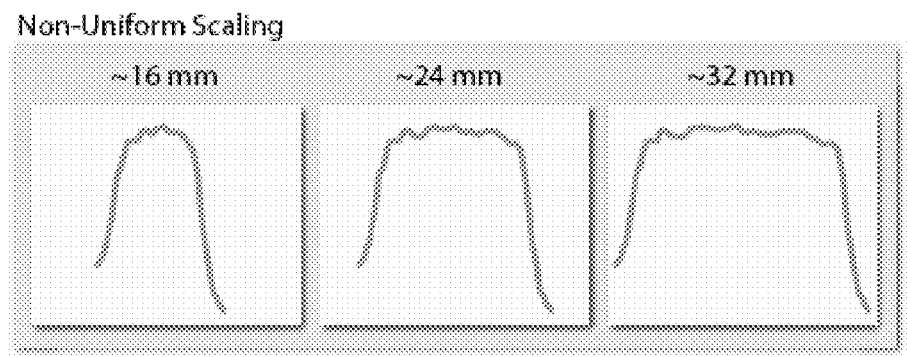
FIG. 4 shows different scalings of the representative mean ray profile of FIG. 3.

The profile matching to detect the anatomical structure of interest is repeated for each of the selected contextual profiles. A contextual profile provides a mean ray profile which represents a structure together with the information about a minimal and a maximal extent of the structure. To allow the search for structures within this range along the current ray profile, a non-uniform scaling of the mean ray profiles are performed. In FIG. 4 the minimal (left) and the maximal scaling (right) is shown for the mean ray profile (center) to cover a structure range from about 16 to 32 mm. The scaling algorithm only performs a scaling on positions where the gradient magnitude is low. This technique avoids an undesirable change of the steepness of the major slopes.

The implementation of the profile matching is described in the following algorithm where the mean ray profile and the current ray profile are represented by intensities as well as gradient magnitudes. Thus, the summed Euclidean distances are calculated for the corresponding intensities and gradient magnitudes.

1: set pos=0, width=0, minCost=MAX VALUE
2: for each scaling of the mean ray profile m do
3: for each step s along the current ray profile c do
4: if s+m.length<c.length then
5: sum up squared Euclidean distances (SEDs) at the corresponding positions along m and c (s to s+m.length)
6: end if
7: end for
8: set profile matching cost to sum_of_SEDs/m.length
9: if cost<minCost then
10: set pos=s, width=m.length, minCost=cost
11: end if
12: end for The matching algorithm detects the section along the current ray profile which is most similar to the mean ray profile at different scales. A length normalization of the fitting costs allows the comparison between different scales, as well as responses between different contextual profiles. This is especially important if multiple contextual profiles are selected and thus, the ray profile is scanned for different structures. For instance, if an abdominal data set is loaded the contextual aorta profile and the contextual vertebra profile might be selected. To decide which structure is detected, a trade off between the cost function and the suitability of the contextual profile for the current environment has to be calculated. In the following, low costs of the profile matching are equivalent to a good or high response of a contextual profile.

Alternative profile matching algorithms may comprise the calculation of the root square mean difference, the linear regression or similar methods.

Optimizations

To decrease ambiguities of the contextual profile response and to increase the performance of the system the following optimizations can be applied to the algorithm.

First of all, the positions of clipping planes are considered before the template matching is performed. Only the part of the volume which is not clipped away is analyzed for matching regions. On the one hand this lowers the computational cost and on the other hand it reduces the chances of ambiguities. For example, in the case of the contextual vessel profile, a vessel which is located in front of another vessel along the ray but clipped away could lead to unintended results.

A second optimization which is applied for similar reasons takes the opacity transfer function into account. The analysis of the ray profile starts only at a sample position where a small opacity threshold is exceeded. From this position on the remaining part of the ray (if not clipped away) is considered.

Third, the cost function for the template matching is implemented so that the costs slightly increase along the ray. With this adjustment, structures which are closer to the viewer, e.g., vessels which are in front of other vessels, return lower costs. To apply this modified cost function line 8 in the algorithm given above is replaced by the following equation $$\text{cost}=(\text{sum\_of\_SEDs}/m.\text{length})\times(1+0.5\times s/c.\text{length}),$$

where sum_of_SEDs are the summed-up squared Euclidean distances, m.length is the sample size of the current matching template, s is the current sample position along the ray profile, and c.length is the total sample size of the ray profile.

Preferably, the cost is multiplied with a penalty factor of up to 1.5 for distant structures leading to good results for features which appear multiple times along the viewing ray.

Despite of the improvements achieved by the equation above two overlapping target structures which are very close to each other might still be problematic. An example is if the aorta due to the current viewpoint of the volumetric view is right in front of some vertebrae and contextual profiles for both structures are active. If the user is continuously tracing along the aorta it would be quite disturbing if the contextual vertebra profile and the contextual aorta profile alternate in generating the better response. In order to solve this problem all but one contextual profiles are deactivated as long as a continuous tracing goes on. As soon as the hot key or control key on keyboard 15 (see FIG. 8) is released the other contextual profiles are re-activated. Finally, a default contextual profile is implemented which returns the first-hit position. The opacity is accumulated along the ray until a certain opacity threshold is reached. This contextual profile becomes active if the cost function of the profile matching returns too high values, which means that no contextual profiles are detected along the current ray profile.

Contextual Picking Action

A preferred default action to react on a contextual picking is the highlighting of the detected interest point in the MPR views. For each picking on the volumetric view, a three-dimensional position within the data set is computed. This position can be the center of the target structure along the current viewing ray or the first-hit position if no target structure is detected. The structure's center can be calculated based on information regarding the start and the extent of the structure along the viewing ray which was determined by the profile matching algorithm. To show the obtained position in the MPR views, the axial, coronal, and sagittal cross sections for this volumetric position are displayed in a screen. The centering of this position on the slices, as well as the overlay of crosshairs are used to highlight the target structure.

Another preferred action following a contextual picking is the labeling of anatomical structures. Often the labeling is performed on the slice views alone although the volumetric view can be very well suited for this task. For instance by utilizing the contextual vertebra profile, the physician gets more flexibility in the spine labeling process. The whole spine can be easily labeled in the 3D view. A single contextual picking on each vertebra determines the exact three-dimensional position of each label.

Finally, the estimation of feature center points during the continuous tracing along a structure can be utilized to calculate approximate centerlines of tubular structures like vessels. If the obtained approximation is not sufficient it can be a helpful initial input for more accurate centerline detection algorithms.

Performance and Results

The contextual picking method according to the invention can be implemented in Java and the contextual profiles as well as the ray profile library are stored in XML format. For parsing and manipulation of the XML files within the Java classes the JDOM API, see The JDOM API Project Website. Available online at http://www.jdom.org, September 2008, is used. The contextual picking is integrated into a real world medical workstation. All contextual picking-related computations are performed interactively. For the generation of the ray profile samples in the ray profile library several different CT data sets are used. Preferably, three samples are taken for each anatomical structure from suitable date sets. The data sets shown in the result images of this section are different from the data sets which were used to establish the ray profile library.

Figure 5:
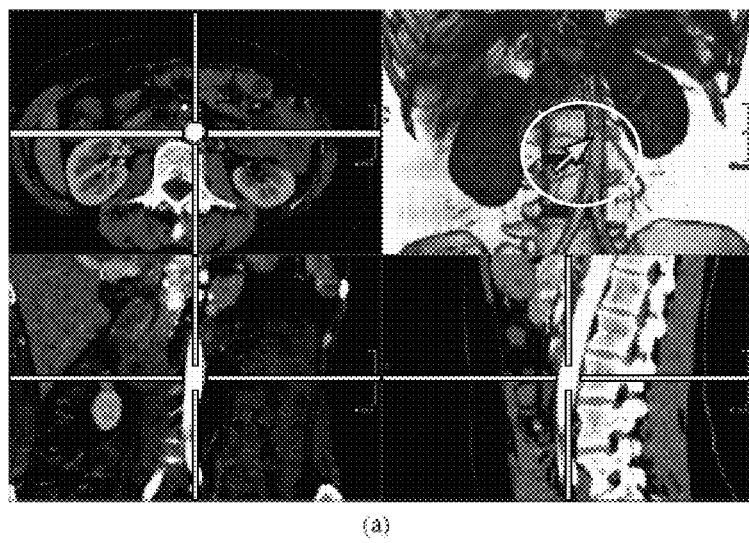
FIG. 5 shows examples of contextual picking on a thoracic-abdominal CT data set.
Figure 5:
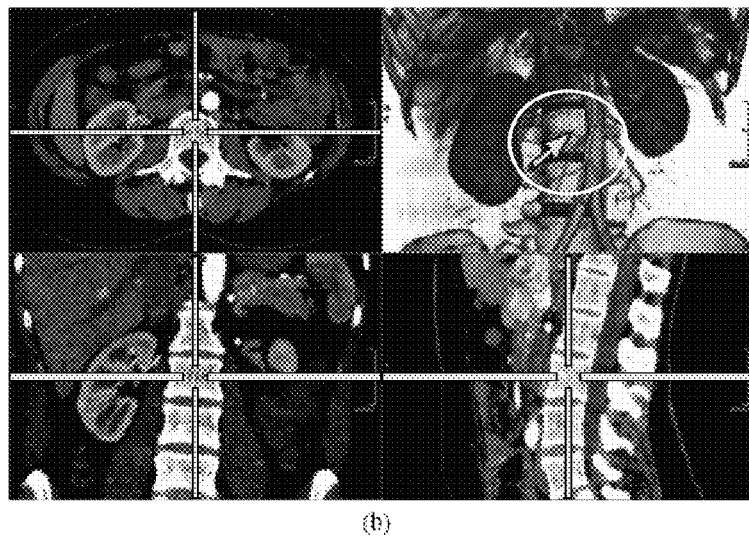

In FIG. 5 the contextual picking is illustrated for a thoracic-abdominal CT data set. After the data set is loaded into the workstation meta information is extracted according to the description given above. Based on this information, the contextual vertebra profile and the contextual aorta profile are selected automatically. When the aorta is picked as in FIG. 5(a), the contextual aorta profile gives the best response. The detected center position of the aorta along the viewing ray is utilized to set up the axial, coronal, and sagittal MPR views. Four different views on the picked anatomical structure are provided to the physician. The picking of a close-by vertebra in FIG. 5(b) leads to analogous results.

Figure 6:
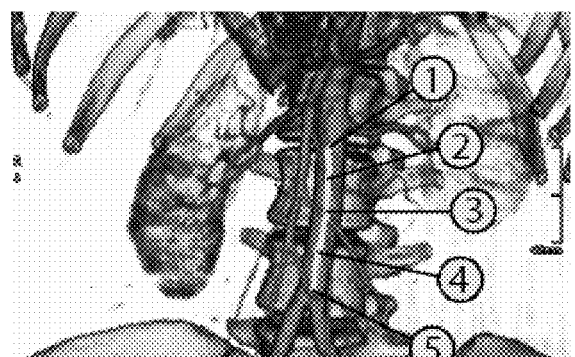
FIG. 6 shows examples of continuous tracking along the aorta.
Figure 6:
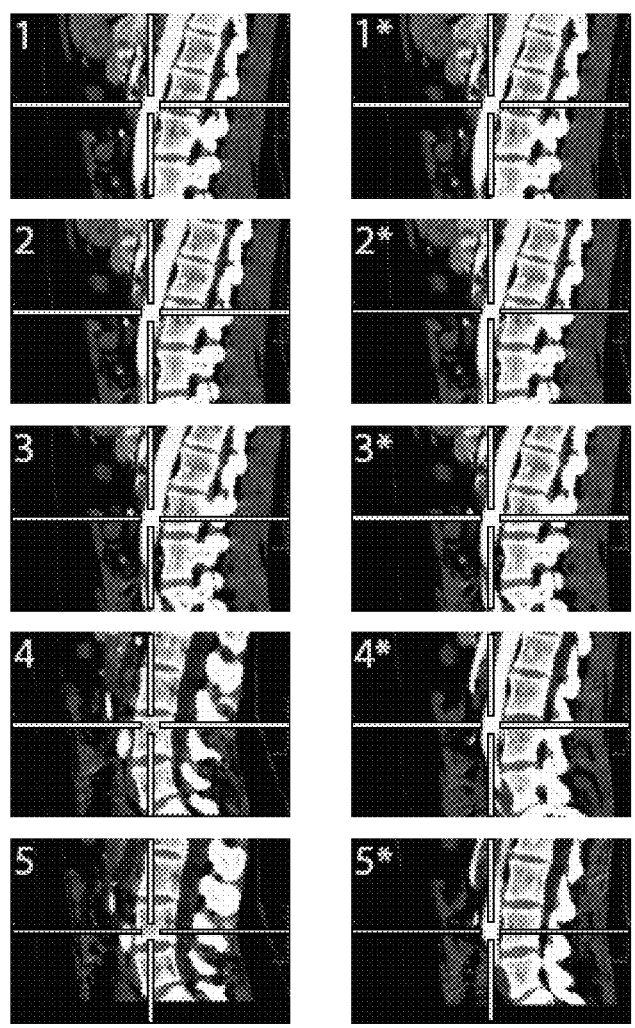

FIG. 6(a) shows the path (indicated by the bright line) of a continuous tracing along a part of the aorta. If the contextual aorta profile and the contextual vertebra profile are active, the contextual vertebra profile has the better response at some positions along the trace path although the user is interested in the examination of the aorta.

FIG. 6(b) shows the resulting sagittal slice views when only the best response is taken into account. The vertebra is captured as the prominent structure at the positions 4 and 5. Whenever a continuous tracing is performed, the assumption can be made that the user currently examines a single anatomical structure.

Thus, just a single contextual profile is active during the continuous tracing and all the others are deactivated temporarily. This leads to the results shown in FIG. 6(c). Along the tracing path, the aorta is always captured as the prominent structure and jerky leaps in the MPR views between the aorta and a vertebra are avoided. The tracing along a tubular structure allows the computation of its approximate centerline.

Figure 7:
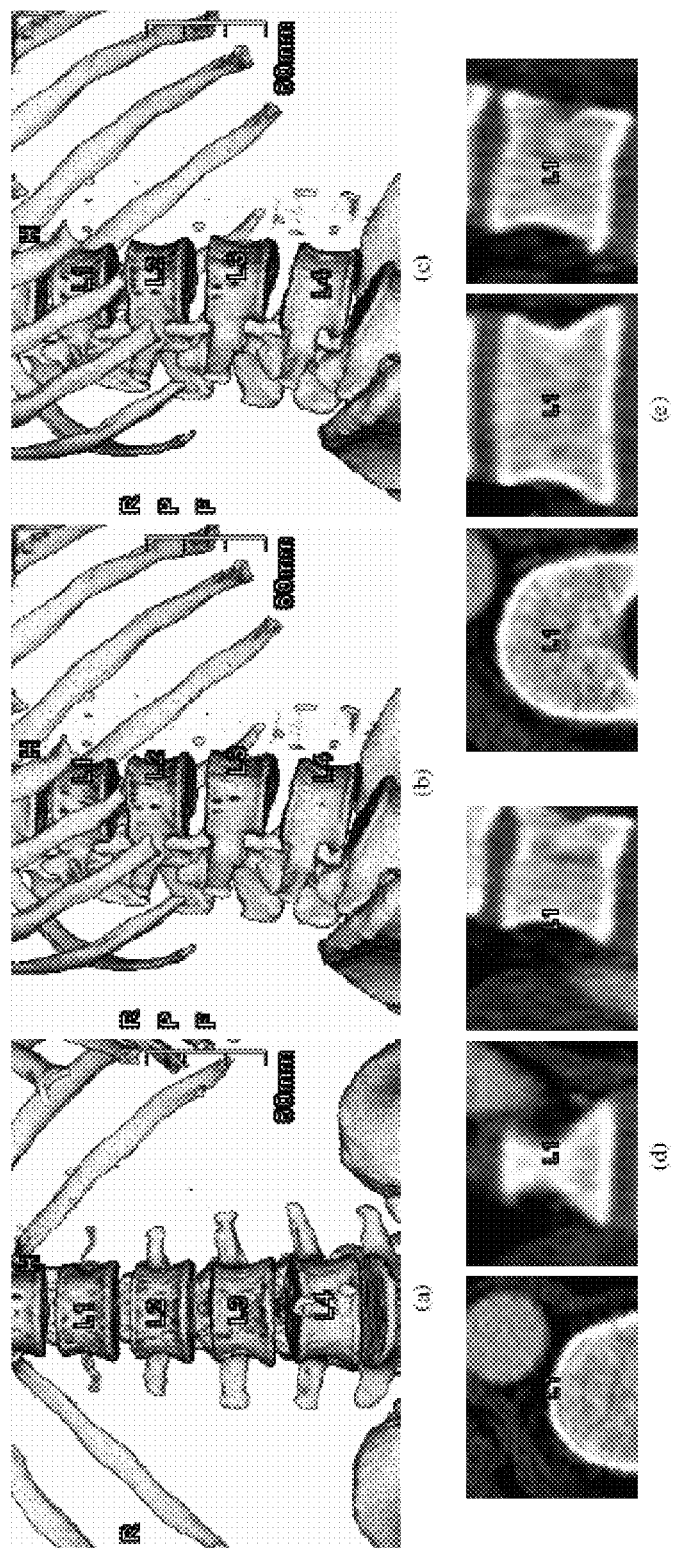
FIG. 7 shows examples of labeling of lumbar vertebrae.

FIG. 7 shows exemplary results when the contextual picking according to an implementation of the invention is integrated into a spine labeling tool. With this tool the user has to specify the label (e.g. "L1") for the first picked vertebra and a labeling direction (head-to-feet or feet-to-head). Then a single picking on each vertebra leads to the results shown in FIG. 7(a). FIG. 7(b) shows the labeling from another viewpoint if just the first-hit position is taken for the 3D placement of the labels. If the placement is done by taking the positions determined by the contextual picking, the labels are in the center of the vertebral body as shown for the same viewpoint in FIG. 7(c). The exact positions of the labels ("L1") are depicted on the axial, coronal and sagittal slices for the first-hit approach in FIG. 7(d) and for the contextual picking approach in FIG. 7(e).

While this invention has been particularly shown and described with references to preferred embodiments thereof, it will be understood by those skilled in the art that various changes in form and details may be made therein without departing from the scope of the invention encompassed by the appended claims.

What is claimed is:

1. A method performed by a computer system for determining a position in an image of an object, comprising:
   displaying a volume rendering of image data acquired from the object,
   pointing at a structure of interest displayed in the volume rendering of the image data,
   generating a viewing ray profile comprising information characterizing a ray running through said structure of interest,
   selecting a contextual profile from various contextual profiles, each of said contextual profiles comprising a representative ray profile representing a viewing ray profile of a structure and comprising profile information, and
   determining a position within said structure of interest based on said profile information of said selected contextual profile in the case that the representative ray profile of said selected contextual profile matches with at least a part of said viewing ray profile.

2. The method according to claim 1, wherein the image is a medical image of a patient and the structure is an anatomical structure of the patient.

3. The method according to claim 1, wherein a data set comprising said image data and meta data is obtained when an image of the object is acquired, said meta data characterizing the object, the acquisition of the image data, or both, and wherein the selection of the contextual profile is based on said meta data.

4. The method according to claim 3, wherein said meta data comprises information about at least one of the following:
   a part of the object to be examined,
   a description of an examination of the part of the object,
   age, sex, weight of a patient, or a combination thereof,
   an imaging modality by means of which the image data was acquired,
   spatial relations of images within a series of images of the object,
   a protocol name comprising a user-defined description of conditions under which a series of images of the object was performed, and
   a description of a performed procedure step.

5. The method according to claim 1, wherein the selection of the contextual profile is based on information characterizing a setup of a medical workstation by means of which the acquisition, display of the image data, or both is controlled.

6. The method according to claim 1, wherein the selection of the contextual profile is based on information characterizing a selection of a clinical tool to be used for certain diagnostic actions.

7. The method according to claim 1, wherein said profile information comprises information about at least one of the following:
   a type of the structure,
   a list of keywords characterizing a type of data sets, or a setup of a medical workstation, or both,
   a range of a typical extent of the structure,
   a default reaction upon pointing at the structure of interest, and
   a kind of a position to be determined.

8. The method according to claim 1 wherein said information characterizing said ray running through said structure of interest comprises intensity values, gradient magnitude values along said ray, or both.

9. The method according to claim 1, wherein the representative ray profile is a mean ray profile which is derived from pre-defined ray profile samples of said structure, each of said ray profile samples comprising intensity values, gradient magnitude values along a ray running through said structure, or both.

10. The method according to claim 9, wherein said pre-defined ray profile samples are defined by user-selection of samples from ray profiles of different structures.

11. The method according to claim 1, wherein the structure of interest is highlighted in the displayed volume rendering, in a corresponding two-dimensional rendering of the image data, or in both.

12. The method according to claim 1, wherein a label is placed at the structure of interest in the displayed volume rendering, in a corresponding two-dimensional rendering of the image data, or in both.

13. The method according to claim 1, wherein a centerline of the structure of interest is calculated and placed in the displayed volume rendering, in a corresponding two-dimensional rendering of the image data, or in both.

14. The method according to claim 1, wherein the representative ray profile is a pre-defined template.

15. An apparatus for determining a position in an image, comprising:
- a display for displaying a volume rendering of image data acquired from an object,
- a pointing unit for pointing at a structure of interest displayed in the volume rendering of the image data, and
- a processing unit for
  generating a viewing ray profile comprising information characterizing a ray running through said structure of interest,
  selecting a contextual profile from a list of contextual profiles, each of said contextual profiles comprising a representative ray profile representing a viewing ray profile of a structure, and comprising profile information, and
  determining a position within said structure of interest based on said profile information of said selected contextual profile in the case that the representative ray profile of said selected contextual profile matches at least a part of said viewing ray profile.

16. The apparatus according to claim 15, wherein the image is a medical image of a patient and the structure is an anatomical structure of the patient.

17. The apparatus according to claim 15, wherein the processing unit is designed for selecting the contextual profile based on meta data, said meta data characterizing the object, the acquisition of the image data, or both, and wherein the selection of the contextual profile is based on said meta data.

18. The apparatus according to claim 15, wherein the processing unit is designed for selecting the contextual profile based on information characterizing a setup of a medical workstation by means of which the acquisition, or display of the image data, or both is controlled.

19. The apparatus according to claim 15, wherein the representative ray profile is a pre-defined template.

* * * * *

UNITED STATES PATENT AND TRADEMARK OFFICE
CERTIFICATE OF CORRECTION

| | | |
|---|---|---|
| PATENT NO. | : 8,471,846 B2 | Page 1 of 1 |
| APPLICATION NO. | : 12/625771 | |
| DATED | : June 25, 2013 | |
| INVENTOR(S) | : Peter Kohlmann et al. | |

It is certified that error appears in the above-identified patent and that said Letters Patent is hereby corrected as shown below:

In the Specification

In column 10, line 41, delete "min" and insert --mm--.

In the Claims

In Claim 1, column 15, line 64, delete "miming" and insert --running--.

Signed and Sealed this
Seventeenth Day of September, 2013

Teresa Stanek Rea
*Deputy Director of the United States Patent and Trademark Office*